United States Patent [19]
Kajiura

[11] Patent Number: 5,661,883
[45] Date of Patent: Sep. 2, 1997

[54] MACHINE TOOL HAVING REVOLVABLE SPINDLES

[76] Inventor: Katsuhiro Kajiura, 3-1, Yashiki 4-chome, Narashino-shi, Japan

[21] Appl. No.: 481,283

[22] PCT Filed: Nov. 25, 1994

[86] PCT No.: PCT/JP94/01988

§ 371 Date: Aug. 14, 1995

§ 102(e) Date: Aug. 14, 1995

[87] PCT Pub. No.: WO95/14378

PCT Pub. Date: Jun. 1, 1995

[30] Foreign Application Priority Data

Feb. 15, 1994 [JP] Japan ................. 6-18153

[51] Int. Cl.$^6$ ............. B23B 19/02; B23C 1/04; B23C 5/28
[52] U.S. Cl. ................... 29/38 B; 409/135; 409/231; 451/488; 451/449; 451/403
[58] Field of Search ................ 409/135, 136, 409/231; 82/142, 900, 129; 29/27 R, 28, 27 C, 563, 38 A, 38 B; 451/488, 449, 403

[56] References Cited

U.S. PATENT DOCUMENTS

| | | | |
|---|---|---|---|
| 3,924,355 | 12/1975 | Tatsumi et al. | 451/65 |
| 4,286,413 | 9/1981 | Axelsson et al. | 451/5 |
| 4,471,577 | 9/1984 | Ogawa et al. | 451/65 |
| 4,580,471 | 4/1986 | Oyama et al. | 409/135 |
| 4,952,105 | 8/1990 | Kitamura | 409/135 |
| 5,062,330 | 11/1991 | Trautmann et al. | 82/147 |

FOREIGN PATENT DOCUMENTS

| | | | |
|---|---|---|---|
| 3200937 | 8/1982 | Germany. | |
| 4-2441 | 1/1992 | Japan | 409/135 |
| 4-2439 | 1/1992 | Japan | 409/135 |
| 2193452 | 2/1988 | United Kingdom. | |

Primary Examiner—Maurina T. Rachuba
Assistant Examiner—Christopher Kirkman
Attorney, Agent, or Firm—Adams & Wilks

[57] ABSTRACT

A machine tool comprises at least one revolvable spindle having an end for supporting a work piece, a first processing tool disposed opposite to the end of the spindle for processing the work piece, a second processing tool disposed parallel to the first processing tool, and a revolving unit for revolving the spindle about a central revolving axis to place the end of the spindle opposite to the second processing tool for processing the work piece. A chamber is disposed on the outer peripheral surface of the work spindle. A pair of inlet and outlet connections are revolved integrally with the work spindle and are arranged on opposite sides of the central revolving axis. Connecting pipes connect the inlet and outlet connection on one side of the central revolving axis to the inlet and outlet connection at the opposite side of the central revolving axis through the chamber. A coolant supply pipe is provided for supplying a coolant to the chamber through the inlet and outlet connections and the connecting pipes. By this construction, the coolant supplied to the chamber in the spindle cools not only the work spindle but also the vicinity of portions of the spindle constituting heat sources, thereby permitting the work piece to be processed accurately over time.

17 Claims, 3 Drawing Sheets

MACHINE TOOL HAVING REVOLVABLE SPINDLES

FIELD OF THE INVENTION

The present invention relates to a machine tool having two revolvable spindles, and more particularly to an internal grinding machines, etc., capable of sufficiently cooling a work spindle and thus providing accuracy for shaping work pieces in a stable manner and without any changes in the lapse of time.

BACKGROUND OF THE INVENTION

As shown in FIG. 3, a conventionally known machine tool of this type is an internal grinding machine equipped with two work spindle stocks 1 and 2 and wheel spindle stocks 3 and 4 (this type of machine tool is called a simultaneous double spindle internal grinding machine). The work spindle stocks 1 and 2 are provided with revolvable work spindles 100 and 200 arranged in parallel and respectively having chucks 101 and 201 on their tip parts for setting work pieces.

The wheel spindle stock 3 is provided with a first grinding wheel 300 and the other wheel spindle stock 4 is provided with a second grinding wheel 400. The first grinding wheel 300 is placed opposed to the tip of the work spindle 100 and the wheel spindle stock 3 is attached to a built-in rotary shaft with a quill while the second grinding wheel 400 is placed opposed to the tip of the other work spindle 200 and the wheel spindle stock 4 is attached to the built-in rotary shaft with the quill.

Both work spindle stocks 1 and 2 are attached to an index unit 5 for revolving (180°) the work spindles 100 and 200 of both work spindle stocks 1 and 2 against each other and, by this revolving movement, the positions of the work spindles are reversed so that the tip of the work spindle 100, which is initially opposed to the first grinding wheel 300, is placed opposite to the second grinding wheel 400 and the tip of the other work spindle 200, which is initially opposed to the second grinding wheel 400, is placed opposite to the first grinding wheel 300.

The wheel spindle stock 3 is constructed by an SZ table 6 movable in an SZ direction and an SX table 7 movable in an SX direction, and the other wheel spindle stock 4 is constructed by a BZ table 8 movable in a BZ direction and a BX table 9 movable in a BX direction so as to be moved in these directions as indicated by arrows in FIG. 3. Angles for the BX and SX tables 9 and 7 can be optionally set against the BZ and SZ directions.

The internal grinding machine of this type allows simultaneous grindings by the first and second grinding wheels 300 and 400. In particular, by the revolving movement of the index unit 5, after pieces to be worked set on one work spindle 100 are ground by the first grinding wheel 300, they can be ground again by the second grinding wheel 400 without any setting changes, resulting in one chucking work necessary for both grindings. Thus, it is a suitable machine for grinding pieces requiring highly accurate concentricity on two parts to be ground, e.g., a fuel injection nozzle having a hole part and a conical part on its tip.

Further, when the respective work spindles 100 and 200 are expanded by heat generated during grindings by the first and second grinding wheels 300 and 400, a grinding position (the position of the first or the second grinding wheel 300 or 400 against the work spindle 100, or against the other work spindle 200) is changed and the grinding accuracy is adversely affected. Thus, when the work pieces are ground by the first and second grinding wheels 300 and 400, both work spindles 100 and 200 are cooled by spraying coolant on the outer peripheral frames thereof from the upper sides.

In the internal grinding machine of the conventional type mentioned above, a means adopted for cooling both work spindles 100 and 200 is one by which coolant is sprayed on their outer peripheral frames from above. However, this is not a good means to sufficiently cool the work spindles 100 and 200 because not many parts thereof are directly sprayed by coolant, thereby resulting in cooling of only a few areas of the spindles. Moreover, there exist bearings for the work spindles 100 and 200 within their outer peripheral frames and bearings for revolving movement of the index unit therewithin as heat sources which are not sufficiently cooled. For this reason, various problems occur, such as the gradual increase in temperature of the work spindles 100 and 200 leading to the gradual expansion thereof, shifts in the grinding positions (of the first grinding wheel 300 against one work spindle 100, etc.) due to the expansion, and variable and thus unstable accuracy for shaping work pieces with the lapse of time and the like.

The present invention is based on such a background and its object is to provide a machine tool having two revolvable spindles, e.g., an internal grinding machine capable of sufficiently cooling the work spindles and thus providing accuracy for shaping work pieces in a stable manner even with the lapse of time.

SUMMARY OF THE INVENTION

In order to achieve the object mentioned above and other objects, the present invention provides a machine tool having first and second revolvable work spindles arranged in parallel with work pieces set on tip portions thereof, a first tool disposed opposite to the tip of the first work spindle, a second tool disposed opposite to the tip of the second work spindle and means for revolving both work spindles about a central revolving axis to place the tip of the first work spindle opposed to the second tool and the tip of the second work spindle opposed to the first tool. Cooling jackets are arranged on the outer peripheral surfaces of each of the work spindles and circumferentially thereof and are supplied with coolants. A pair of inlet and outlet connections are provided in the revolving means at opposite sides of the central revolving axis and can be revolved together with the work spindles. The inlet and outlet connections and the cooling jackets are connected to each other by means of connecting pipes. The connecting pipes form a series of flow paths leading from one inlet and outlet connection to the other inlet and outlet connection through the cooling jackets. A coolant supplying means supplies coolant to the inlet and outlet connections.

According to the present invention, coolant is supplied by the coolant supplying means to the inlet and outlet connection at one side of the central revolving axis and flows into the inlet and outlet connection at the opposite side of the central revolving axis through the cooling jackets around the first and second work spindles before the work spindles are revolved, while it flows reversely after the work spindles are revolved. The coolant supplied to the cooling jackets cools not only the work spindles themselves but also the vicinity of those portions constituting heat sources such as bearings for the work spindles.

DETAILED DESCRIPTION OF THE PREFERRED EMBODIMENT

A preferred embodiment of the internal grinding machine as a machine tool having two revolvable spindles according to the present invention will be described in detail with reference to the accompanying drawings.

Figure 1:
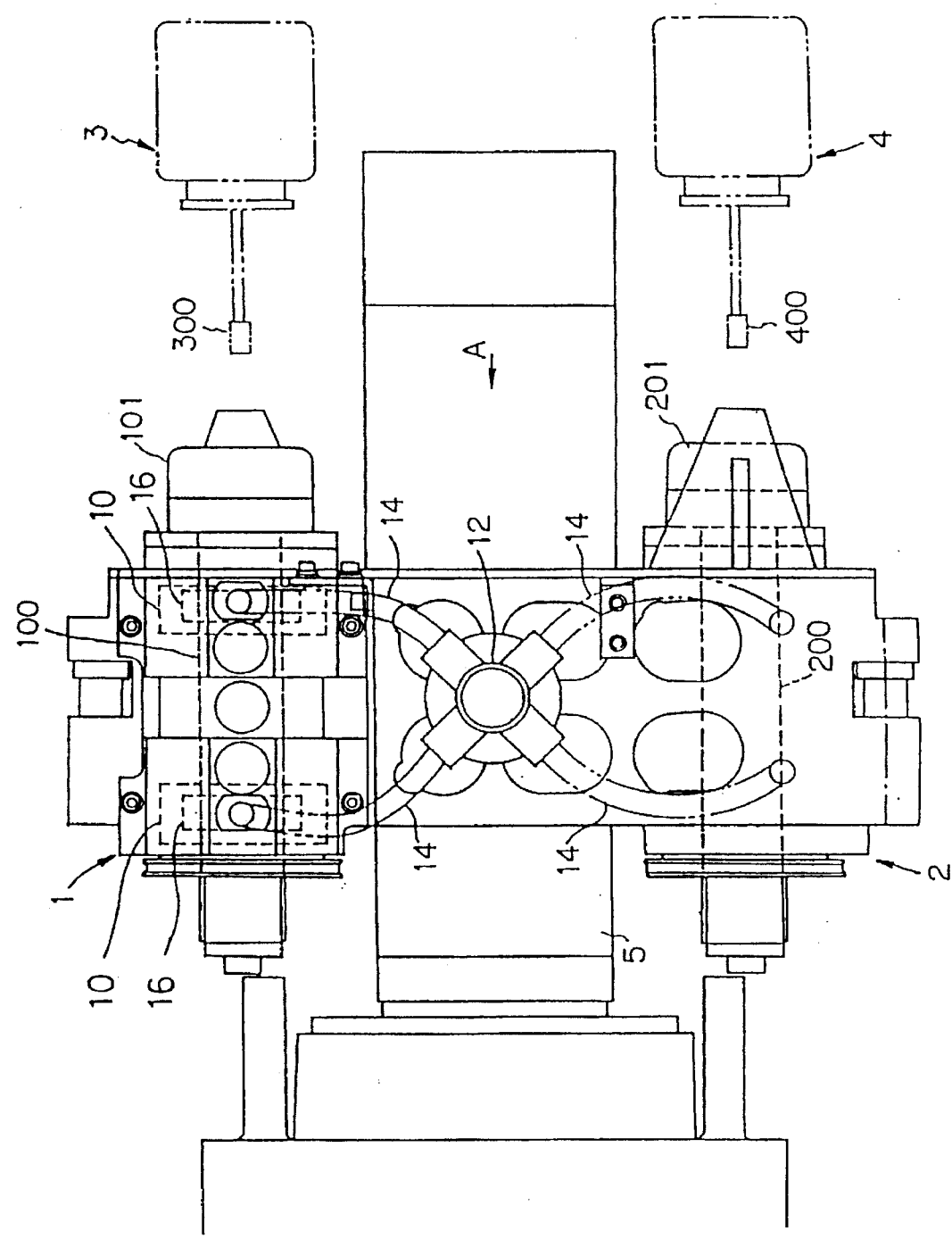
FIG. 1 is a top view showing the main components of an internal grinding machine as a suitable machine tool having two revolvable spindles.
Figure 3:
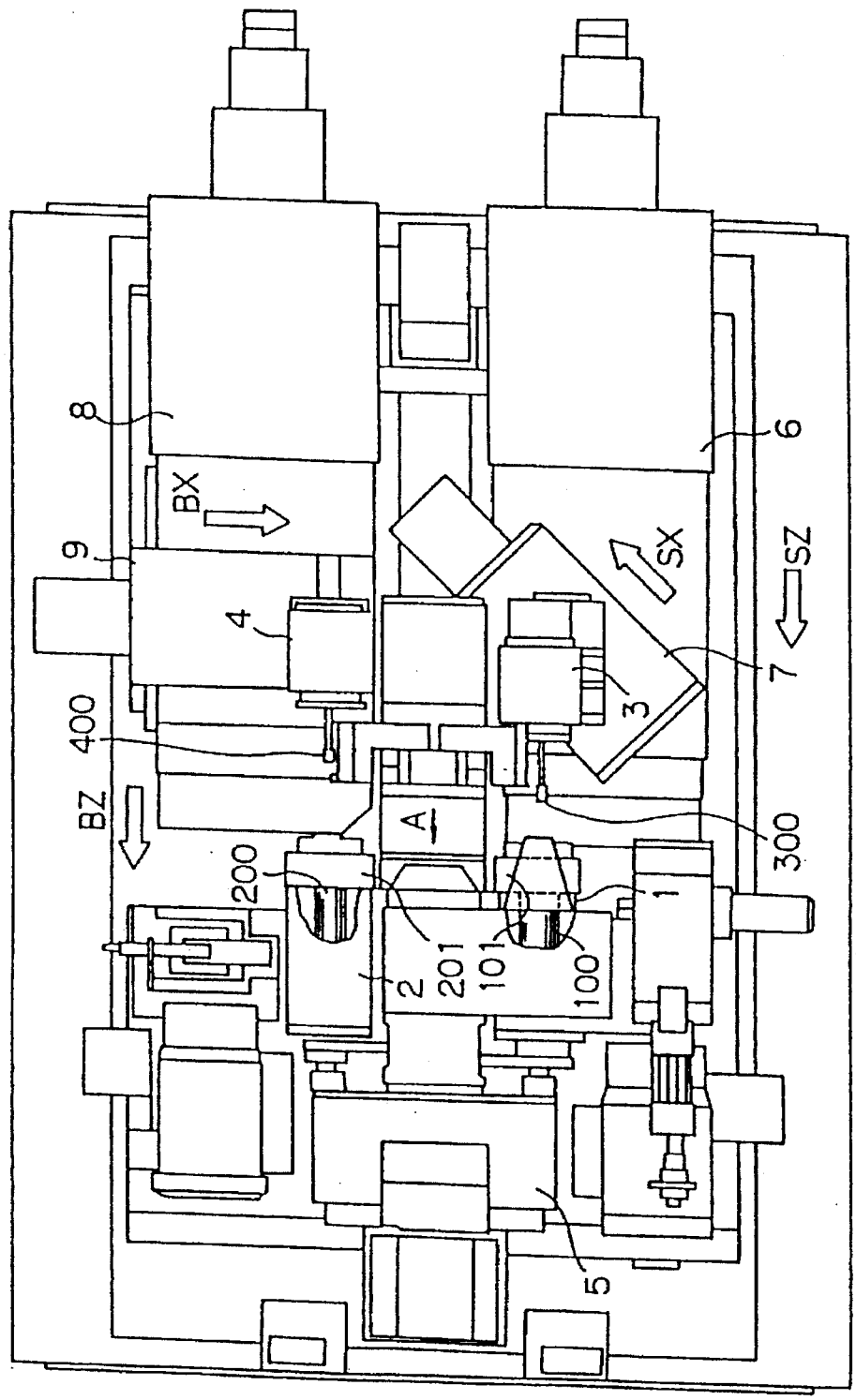
FIG. 3 is a top view showing a conventional internal grinding machine.

The basic construction of the internal grinding machine shown in FIG. 1 is similar to that of the conventional type shown in FIG. 3. Two work spindle stocks 1 and 2 and wheel spindles stocks 3 and 4 are provided, the work spindle stocks 1 and 2 being provided with work spindles 100 and 200, respectively, and being arranged in parallel. The wheel spindle stock 3 is provided with a first grinding wheel 300 and the other wheel spindle stock 4 is provided with a second grinding wheel 400. Initially, the first grinding wheel 300 is placed opposed to the tip of an end of the work spindle 100 and the second grinding wheel 400 is placed opposed to the tip of an end of the other work spindle 200. The work spindle stocks 1 and 2 are attached to a revolving means, such as an index unit 5, for revolving the work spindles 100 and 200 about a central revolving axis $O_1$ to reverse the positions thereof. Thus, the same reference numerals will be used for the same elements corresponding to the conventional grinding machine shown in FIG. 3 and their detailed description will be omitted.

Figure 2:
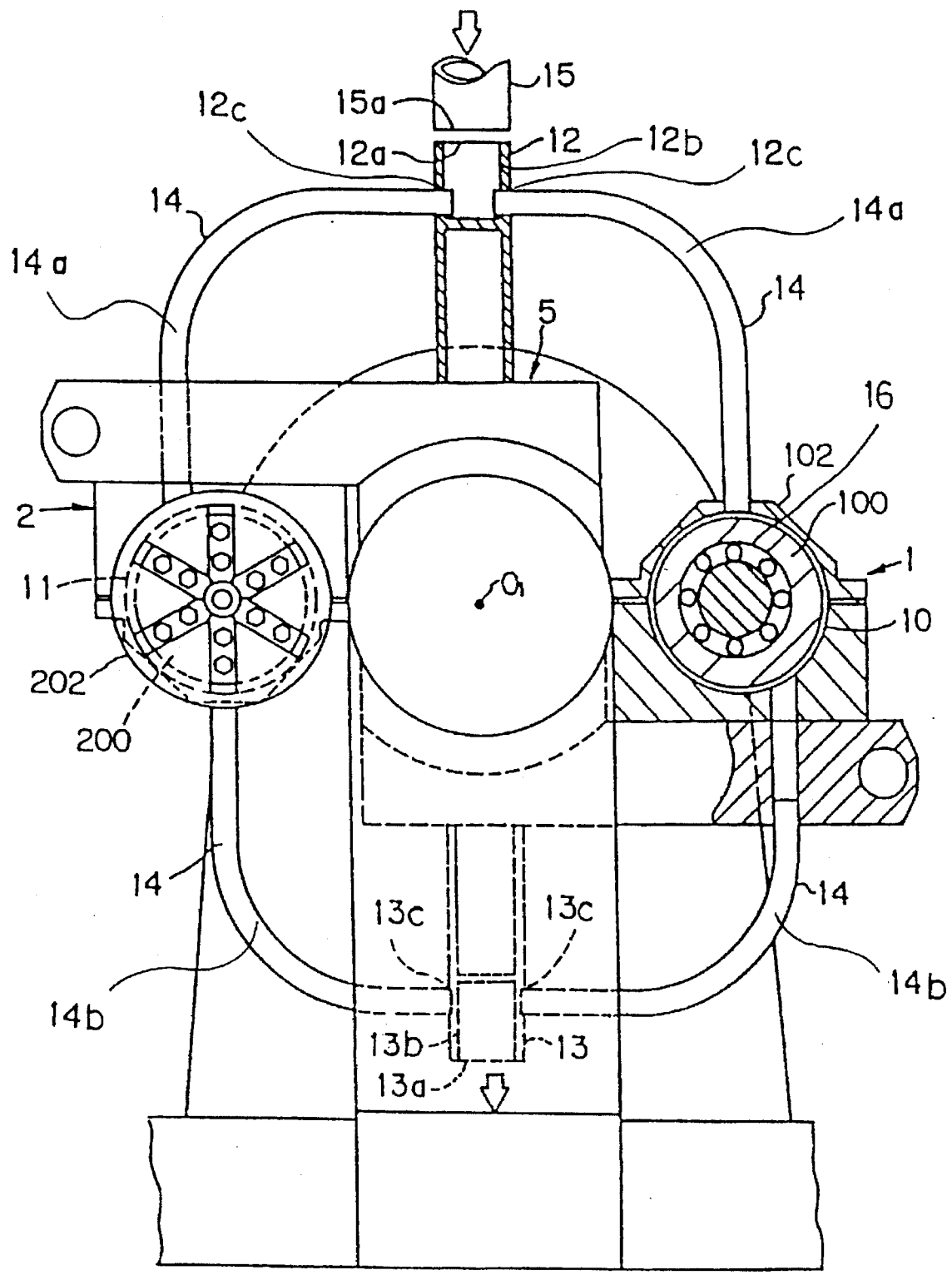
FIG. 2 is a view of the internal grinding machine shown in FIG. 1 along the direction of arrow A (As for the work spindle 100, it shows the section of a bearing 16)

The internal grinding machine shown in FIGS. 1 and 2 (as for the work spindle 100, FIG. 2 shows a section of a bearing 16) is provided with a chamber or a cooling jacket 10 disposed between the work spindle 100 and its outer peripheral frame 102, and a chamber or a cooling jacket 11 disposed between the outer work spindle 200 and its outer peripheral frame 202. The cooling jackets 10 and 11 are directly placed on the outer peripheral surfaces of the work spindles 100 and 200, respectively, and completely around the circumferential surfaces thereof. A coolant is supplied to the cooling jackets 10 and 11 as further described below.

The index unit 5 is provided with a pair of inlet and outlet connections 12 and 13. The inlet and outlet connection 12 comprises a tubular member 12b having an open end 12a and ports 12c in fluid communication with the open end 12a. The inlet and outlet connection 13 comprises a tubular member 13b having an open end 13a and ports 13c in fluid communication with the open end 13a. The inlet and outlet connections 12, 13 can be revolved together with the work spindles 100, 200 and are arranged diametrically on opposite sides (upper and lower positions as shown in FIG. 2) of the central revolving axis $O_1$. That is, the internal grinding machine is constructed in such a manner that when the inlet and outlet connection 12 is positioned above the central revolving axis $O_1$ (as viewed in FIG. 2), the inlet and outlet connection 13 is positioned below the central axis $O_1$, while when the reverse is true, the inlet and outlet connection 13 are positioned above the central revolving axis $O_1$.

The inlet and outlet connections 12, 13 and the cooling jackets 10, 11 are connected to each other by means of connecting pipes 14. The connecting pipes 14 comprise a first set of connecting pipes 14a and a second set of connecting pipes 14b arranged on opposite sides (upper and lower positions as shown in FIG. 2) of the central revolving axis $O_1$. Each of the connecting pipes 14a has a first end connected in fluid communication to each port 12c of the inlet and outlet connection 12, and a second end connected in fluid communication with one of the cooling jackets 10, 11. Similarly, each of the connecting pipes 14b has a first end connected in fluid communication to each port 13c of the inlet and outlet connection 13, and a second end connected in fluid communication with one of the cooling jackets 10, 11. Thus the connecting pipes 14 form a series of flow paths leading from the inlet and outlet connection 12 to the inlet and outlet connection 13 through the cooling jackets 10, 11.

A coolant supplying pipe 15 having a supplying port 15a is arranged in fluid communication with either the inlet and outlet connection 12 or the inlet and outlet connection 13 and constitutes a means for supplying coolant to the inlet and outlet connections 12, 13. The supplying port 15a of the coolant supplying pipe 15 is initially placed opposite to open end 12a of the inlet and outlet connection 12. However, when the inlet and outlet connections 12 and 13 are revolved with the work spindles 100 and 200 by the revolving movement of the index unit 5, the supplying port 15a is placed opposite to the open end 13a of the inlet and outlet connection 13.

A description of the operation of the internal grinding machine constructed in the above-mentioned manner will follow with reference to FIGS. 1 and 2.

According to the internal grinding machine of the present invention, when work pieces set on the work spindle 100 are ground by the first grinding wheel 300, or work pieces set on the work spindle 200 are ground by the second grinding wheel 400, a coolant is supplied from the coolant supplying pipe 15 to the inlet and outlet connection 12. Coolant supplied to the inlet and outlet connection 12 flows through the connection pipes 14a to the cooling jackets 10 and 11. The coolant supplied to the cooling jackets 10, 11 cools not only the work spindles 100 and 200 directly but the vicinity of those portions constituting heat sources, such as bearings 16 for the work spindles 100 and 200, are also cooled as well. Thereafter, the coolant flows from the cooling jackets 10 and 11 through the connection pipes 14b to the inlet and outlet connection 13 and is discharged therefrom.

When a grinding operation by the first and second grinding wheels 300 and 400 is completed and the index unit 5 is operated, the work spindles 100 and 200 of both work spindle stocks 1 and 2 are revolved to reverse the positions thereof about the central revolving axis together with the positions of the inlet and outlet connections 12 and 13. The period of time needed for the revolution and reversal in position of the inlet and outlet connections 12, 13 is about 0.5 second.

By the foregoing operation, work pieces set on the work spindle 100 can be ground by the second grinding wheel 400 while work pieces set on the work spindle 200 can be ground by the first grinding wheel 300, and the supplying port 15a of the coolant supplying pipe 15 and the opening end 13a of the inlet and outlet connection 13 are placed opposed to each other so that coolant can be supplied from the coolant supplying pipe 15 to the inlet and outlet connection 13. Then, when the work pieces set on the work spindle 100 are ground by the second grinding wheel 400 and the work pieces set on the work spindle 200 are ground by the first grinding wheel 300, coolant is supplied from the supplying port 15a of the coolant supplying pipe 15 to the inlet and outlet connection 13.

Thereafter, the coolant which is supplied to the inlet and outlet connection 13 as mentioned above flows through the connection pipes 14b to the cooling jackets 10 and 11. As described above, not only are the work spindles 100 and 200 directly cooled but also the vicinity of those portions constituting heat sources, such as bearings for the work spindles 100 and 200 and the like, are cooled as well. Thereafter, coolant flows from the cooling jackets 10 and 11 through the connection pipes 14a to the inlet and outlet connection 12 and is discharged therefrom.

According to the present invention, coolant enters the inlet and outlet connection 12 and flows into the inlet and outlet connection 13 through the cooling jacket 10 before the work spindles 100, 200 are reversed, while it flows reversely after the work spindles are reversed. Thus the work spindles 100 and 200 and heat sources such as bearings thereof and the like can be cooled by coolant passing through the cooling jackets 10 and 11 anytime, irrespective of whether the coolant is flowing before or after the work spindles are reversed. Further, as mentioned above, the inlet and outlet connection 12 serving as an inlet for the coolant before the work spindles are reversed becomes an outlet for the coolant after reversal of the work spindles, while the inlet and outlet connection 13 serving as an outlet for the coolant before the work spindles are reversed becomes an inlet for the coolant after reversal of the work spindles. Therefore, it can be understood that the inlet and outlet connections 12 and 13 serve both as inlets and outlets for the coolant.

Thus, according to the preferred embodiment of the internal grinding machine, since the work spindles and the vicinity of those portions constituting heat sources, such as bearings thereof, are directly cooled by the coolant, the effective area of the work spindles that can be cooled is increased and the work spindles can be sufficiently cooled. Furthermore, since expansion of the work spindles due to a rise in temperature can be prevented and the grinding positions (of the first grinding wheel against one work spindle, etc.) can always be kept constant, accuracy for shaping work pieces can be obtained with high stability and without any changes in the lapse of time.

Moreover, according to the preferred embodiment of the internal grinding machine, coolant supplied from the coolant supplying pipe 15 flows from the inlet and outlet connection 12 through the cooling jackets 10, 11 to the inlet and outlet connection 13 before the work spindles are revolved by the index unit 5 and flows reversely from the inlet and outlet connection 13 through the cooling jackets 10, 11 to the inlet and outlet connection 12 after the work spindles are revolved. Thus, irrespective of whether the coolant flows before or after the work spindles are revolved, the work spindles can be sufficiently cooled and, therefore, used more efficiently.

Furthermore, since during the operation of the index unit 5 the coolant supplying port 15a and the inlet and outlet connections 12, 13 are not positioned in opposing relation to each other, the flow of coolant from the coolant supplying pipe 15 is stopped during such a period. In order to prevent such flowing-out of coolant, it is only necessary to provide the coolant supplying pipe 15 with a valve for stopping the flow of coolant in timed relation with the operation of the index unit 5. Still further, grinding liquid, water and other suitable liquids capable of cooling can be selected for the coolant depending on the particular application.

As a preferred embodiment of the present invention, the internal grinding machine as a machine tool having two revolvable spindles and grinding wheels has been described. However, any grinding machines other than an internal grinding machine, such as grinding machines which can grind outer surfaces, end surfaces, etc, can be used. Further, by switching the tools to turning tools and drills, this invention can be applied to such cutting machines as a lathe and the like.

INDUSTRIAL APPLICABILITY

The machine tool, such as the internal grinding machine, etc., having two revolvable spindles as offered by the present invention, is provided with cooling jackets arranged on outer peripheral surfaces of the work spindles and supplied with coolant as described above. Therefore, since the work spindles and the vicinity of those portions constituting heat sources, such as bearings thereof and the like, are directly cooled by coolant supplied to the cooling jackets, the effective area to be cooled is increased and the work spindles can be sufficiently cooled. Thus expansion of the work spindles due to a rise in temperature, and shifts in grinding positions (of the first grinding wheel against one work spindle, etc.) caused by such expansion can be prevented and the accuracy for shaping work pieces can be obtained in a stable manner and without any changes in the lapse of time.

Furthermore, according to the present invention, coolant supplied from a coolant supplying means flows from an inlet and outlet connection located at one side of the central revolving axis through the cooling jackets to an inlet and outlet connection located at an opposite side of the central revolving axis before reversal of the work spindles by a revolving means while it flows reversely when the work spindles are reversed. Thus, irrespective of whether the coolant flows before or after reversal of the work spindles, the work spindles can be sufficiently cooled and used more efficiently.

I claim:

1. A machine tool comprising: first and second revolvable work spindles arranged in parallel and each having an end portion for supporting a work piece; a first tool disposed opposite to the end of the first work spindle; a second tool disposed opposite to the end of the second work spindle; revolving means for revolving the work spindles about a central revolving axis to place the end of the first work spindle opposite to the second tool and the end of the second work spindle opposite to the first tool; cooling jackets arranged on the outer peripheral surfaces of respective ones of the work spindles and being supplied with a coolant; a pair of inlet and outlet connections revolved integrally with the work spindles and arranged on opposite sides of the central revolving axis; connecting pipes for connecting the inlet and outlet connection on one side of the central revolving axis to the inlet and outlet connection on the opposite side of the central revolving axis through the cooling jackets; and coolant supplying means for supplying a coolant to the inlet and outlet connections.

2. A machine tool according to claim 1, wherein the cooling jackets are formed directly and annularly along the outer peripheral surfaces of the work spindles.

3. A machine tool according to claim 1, wherein the connecting pipes comprise first and second sets of connecting pipes arranged on opposite sides of the central revolving axis; and wherein the connecting pipes define flow passages for flowing coolant supplied from the coolant supplying means from the inlet and outlet connection on one side of the central revolving axis through the first set of connecting pipes to the cooling jackets, and from the cooling jackets through the second set of connecting pipes to the inlet and outlet connection at the opposite side of the central revolving axis for discharge therefrom.

4. A machine tool according to claim 1, wherein the cooling jackets are arranged on the outer peripheries of bearing portions of the work spindles.

5. A machine tool according to claim 1, wherein the first and second tools comprise grinding tools such as grinding wheels or cutting tools such as turning tools.

6. A machine tool according to claim 1; wherein the inlet and outlet connections are disposed diametrically to one another.

7. A machine tool according to claim 1; wherein each of the inlet and outlet connections comprises a tubular member having an open end for receiving the coolant supplied by the coolant supplying means, and a plurality of ports each in fluid communication with the tubular member open end and one of the connecting pipes.

8. A machine tool according to claim 1; wherein the connecting pipes comprise at least two pairs of connecting pipes each arranged on opposite sides of the central revolving axis, one of the pairs of connecting pipes connecting the inlet and outlet connection disposed at one side of the central revolving axis in fluid communication with the cooling jackets, and the other pair of connecting pipes connecting the inlet and outlet connection disposed at the opposite side of the central revolving axis in fluid communication with the cooling jackets.

9. A machine tool according to claim 8; wherein each of the inlet and outlet connections comprises a tubular member having an open end for receiving the coolant supplied by the coolant supplying means, and a plurality of ports each in fluid communication with the tubular member open end and one of the connecting pipes.

10. A machine tool according to claim 1; wherein the coolant supplying means is not connected to the revolving means for revolution about the central revolving axis.

11. A machine tool according to claim 1; wherein the coolant supplying means supplies coolant, without spraying thereof, to the inlet and outlet connections.

12. A machine tool comprising: at least one spindle having an end for supporting a work piece; a first processing tool disposed opposite to the end of the spindle for processing the work piece; a second processing tool disposed parallel to the first processing tool; revolving means for revolving the spindle about a central revolving axis to place the end of the spindle opposite to the second processing tool to enable processing of the work piece by the second processing tool; and cooling means for circulating coolant without spraying thereof to cool the spindle during processing of the work piece; wherein the cooling means comprises a chamber disposed on an outer peripheral surface of the spindle, coolant supplying means for supplying a coolant to the chamber, and conduit means for directing the coolant supplied by the supplying means to the chamber; and wherein the conduit means comprises a pair of tubular members disposed on opposite sides of the central revolving axis, and at least two connecting pipes disposed on opposite sides of the central revolving axis for connecting the tubular members in fluid communication with one another.

13. A machine tool according to claim 12; wherein each tubular member has an open end for receiving the coolant supplied by the coolant supplying means and at least one port in fluid communication with the open end; each of the connecting pipes has an end in fluid communication with each port of each tubular member and another end in fluid communication with the chamber of the spindle; wherein coolant supplied by the coolant supply means into the open end of one of the tubular members flows to the chamber through one of the connecting pipes and from the chamber through the other connecting pipe to the open end of the other tubular member for discharge therefrom.

14. A machine tool according to claim 13; wherein the coolant supplying means has a supplying port for supplying coolant to the open end of one of the tubular members when the end of the spindle is disposed opposite the first processing tool, and for supplying coolant to the open end of the other tubular member when the end of the spindle is disposed opposite the second processing tool.

15. A machine tool comprising: at least one spindle having an end for supporting a work piece; a first processing tool disposed at a first position for processing the work piece; a second processing tool disposed at a second position for processing the work piece; a revolving unit for revolving the spindle about a central revolving axis between the first and second positions to enable processing of the work piece by the first and second processing tools; a coolant supplying device for supplying a coolant to cool the spindle and being unconnected to the revolving unit so as to not revolve about the central revolving axis; and cooling means for circulating the coolant supplied by the coolant supplying device to cool the spindle during processing of the workpiece; wherein the cooling means comprises a chamber disposed at least partly around an outer peripheral surface of the spindle and being supplied with the coolant by the coolant supplying device, and conduit means for directing the coolant supplied by the coolant supplying device to the chamber; and wherein the conduit means comprises a pair of tubular members disposed on opposite sides of the central revolving axis, and at least two connecting pipes disposed on opposite sides of the central revolving axis for connecting the tubular members in fluid communication with one another.

16. A machine tool according to claim 15; wherein each tubular member has an open end for receiving the coolant supplied by the coolant supplying device and at least one port in fluid communication with the open end; each of the connecting pipes has an end in fluid communication with each port of each tubular member and another end in fluid communication with the chamber of the spindle; wherein coolant supplied by the coolant supplying device into the open end of one of the tubular members flows to the chamber through one of the connecting pipes and from the chamber through the other connecting pipe to the open end of the other tubular member for discharge therefrom.

17. A machine tool according to claim 16; wherein the coolant supplying device has a supplying port for supplying coolant to the open end of one of the tubular members when the end of the spindle is disposed opposite the first processing tool, and for supplying coolant to the open end of the other tubular member when the end of the spindle is disposed opposite the second processing tool.

* * * * *

UNITED STATES PATENT AND TRADEMARK OFFICE
CERTIFICATE OF CORRECTION

PATENT NO. : 5,661,883
DATED : September 2, 1997
INVENTOR(S) : Katsuhiro Kajiura It is certified that error appears in the above-identified patent and that said Letters Patent is hereby corrected as shown below:

<u>Title page:</u>
Insert -- Assignee: Seiko Seiki Kabushiki Kaisha, Japan --.

Signed and Sealed this

Thirty-first Day of July, 2001

Attest:

Attesting Officer

NICHOLAS P. GODICI
Acting Director of the United States Patent and Trademark Office